United States Patent
Bang

(10) Patent No.: US 6,671,114 B2
(45) Date of Patent: Dec. 30, 2003

(54) METHOD AND APPARATUS FOR FORMING DATA SECTOR SUITABLE FOR HIGH DENSITY HARD DISK DRIVE

(75) Inventor: Ho-Yul Bang, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/861,157

(22) Filed: May 21, 1997

(65) Prior Publication Data

US 2003/0193728 A1 Oct. 16, 2003

(30) Foreign Application Priority Data

May 21, 1996 (KR) .............................. 96-17281

(51) Int. Cl.$^7$ .............................................. G11B 5/09
(52) U.S. Cl. ......................................... 360/48; 360/51
(58) Field of Search ...................... 360/48, 51, 77.08, 360/53, 46

(56) References Cited

U.S. PATENT DOCUMENTS

| | | | |
|---|---|---|---|
| 4,345,280 A | 8/1982 | Blagaila et al. ............... | 360/49 |
| 4,656,532 A | * 4/1987 | Greenberg et al. ............ | 360/48 |
| 5,210,660 A | 5/1993 | Hetzler ........................ | 360/51 |
| 5,255,136 A | 10/1993 | Machado et al. ........... | 360/720 |
| 5,305,157 A | 4/1994 | Wada et al. .................. | 360/53 |
| 5,438,559 A | 8/1995 | Best et al. .................... | 369/54 |
| 5,446,604 A | 8/1995 | Chiba .......................... | 360/49 |
| 5,475,540 A | 12/1995 | Gold ............................ | 360/48 |
| 5,500,848 A | 3/1996 | Best et al. ................ | 369/275.3 |
| 5,523,903 A | 6/1996 | Hetzler et al. ........... | 360/77.08 |
| 5,581,418 A | 12/1996 | Hasebe ........................ | 360/51 |
| 5,627,695 A | 5/1997 | Prins et al. .................. | 360/51 |
| 5,631,783 A | * 5/1997 | Park ............................ | 360/51 |

OTHER PUBLICATIONS

IBM TDB vol. 37, No. 4A, Apr. 1994, pp. 432,424.

* cited by examiner

Primary Examiner—Regina N. Holder
(74) Attorney, Agent, or Firm—Robert E. Bushnell, Esq.

(57) ABSTRACT

A data sector format suitable for a high density hard disk drive includes an ID region for writing ID information for the data sector, and a data region for writing data transferred from an external device. The ID region is formed within the data region and a synchronization signal for reading the ID information is written into the data region. The data sector includes a data sync region for writing a synchronization signal for reading information written on the data sector, the ID region for writing ID information for the data sector, a PAD region for separating the ID region and the data region, a data address mark region for indicating a validity of data written on the data sector, the data region for writing the data transferred from the external device, and an error correction code region for writing an error correction code to automatically correct an error upon occurrence of a defect when data is written on the data region.

25 Claims, 5 Drawing Sheets

METHOD AND APPARATUS FOR FORMING DATA SECTOR SUITABLE FOR HIGH DENSITY HARD DISK DRIVE

CLAIM FOR PRIORITY

This application makes reference to, incorporates the same herein, and claims all benefits accruing under 35 U.S.C. §119 from an application for METHOD AND APPARATUS FOR FORMING DATA SECTOR SUITABLE FOR HIGH DENSITY HARD DISK DRIVE earlier filed in the Korean Industrial Property Office on May 21, 1996, and there duly assigned Ser. No. 17281/1996.

BACKGROUND OF THE INVENTION

1. Technical Field

The present invention relates to a hard disk drive, and more particularly, relates to a method and apparatus for forming a data sector suitable for a high density hard disk drive in which data sector has a data region including an ID region incorporated therein.

2. Related Art

Hard disk drives (HDD) typically include one or more magnetic disks defining a multiplicity of concentric data tracks. Each data track is divided into sectors with intersector gaps therebetween, and each sector is subdivided into a data sector and a servo sector. The data sectors are used for the storage of main data or user information. The servo sectors are used for the storage of control data such as automatic gain control (AGC) data, track addresses and tracking servo patterns for use in position a head. Magnetic disk drives having high data density generally rely upon servo control systems for moving a selected transducer (head) from a departure track to a destination track location when data information is written or read from the disk. Exemplary disk drive architectures having head position control systems using servo information are disclosed in U.S. Pat. No. 5,210,660 for Sectored Servo Independent Of Data Architecture issued to Hetzler, U.S. Pat. No. 5,255,136 for High Capacity Submicro-Winchester Fixed Disk Drive issued to Machado et al., U.S. Pat. No. 5,305,157 for Read Circuit Providing Two Different Reference Levels For Reading The Servo Sectors And Data Sectors Of A Rotating Data Storage Disk issued to Wada, U.S. Pat. No. 5,475,540 for Magnetic Data Storage Disk Drive With Data Block Sequencing By Using ID Fields After Embedded Servo Sectors issued to Gold, and U.S. Pat. No. 5,627,695 for System And Method For Generating Unique Sector Identifiers For An Identificationless Disk Format issued to Prins.

A typical data sector format of an arbitrary track of the magnetic disk includes a plurality of identification (ID) regions, data regions and PAD regions serving as intersector gaps therebetween. Last PAD region is typically a region for providing a margin between the adjacent data sectors. Commonly, the ID region includes an ID sync, an ID address mark (AM), a head and cylinder number, a sector number, a split and flag, and a cyclic redundancy check code (CRC). The data region includes a data sync, a data address mark (AM), data and an error correction code (ECC). Generally, in order to read information of the ID region and the data region of the respective data sector, the HDD must be synchronized with a clock frequency previously written on the magnetic disk by using the ID sync and data sync. In practice, as I have observed however, since the ID sync is commonly composed of many bytes (for example, 16 to 20 bytes), it is too restrictive for high density HDD application with increase storage capacity.

Recent efforts to formulate data sector format suitable for high density HDDs are disclosed, for example, in U.S. Pat. No. 5,438,559 for Method For Locating Physical Sectors In A Fixed Block Architecture Embedded Servo Disk File #14 issued to Best et al, and U.S. Pat. No. 5,500,848 for Sector Servo Data Recording Disk Having Data Regions Without Identification (ID) Fields issued to Best et al, U.S. Pat. No. 5,532,903 for Sector Architecture For Fixed Block Disk Drive issued to Hetzler et al., and U.S. Pat. No. 5,581,418 for Magnetic Disk Drive Unit Capable Of Determining Data Region Position Of Data Region That Does Not Include Position Identification Data issued to Hasebe. In Best et al. '559 and '848, for example, a fixed block architecture sector format that includes information encoded in the servo region of a sector to enable a data recording head to locate and identify data sector for read and write operations without the need of an ID region Similarly, Hetzer et al. '903 discloses a sector architecture that further includes information contained in electronic storage to enable the data recording head to locate and identify data sectors for read and write operations without using data ID fields. While these contemporary sector architectures for HDDs contain their own merits, it is my observation that further improvement can also be contemplated.

SUMMARY OF THE INVENTION

Accordingly, it is therefore an object of the present invention to provide a disk drive having a data sector format that is suitable for high density recording with increase storage capacity It is also an object to provide an apparatus and method for forming a data sector format suitable for high density disk drives HDD.

It is another object to provide a data sector timing generator for generating a read gate output signal and a write gate output signal for efficient and effective read and write operations of high density HDDs.

According to an aspect of the present invention, a data sector format of a hard disk drive includes an ID region for recording ID information for the data sector, and a data region for recording data transferred from an external communication device such as a host computer. The ID region is formed within the data region and a synchronization signal for reading the ID information is written into the data region. The ID region further includes an ID address mark region for writing an ID address mark for the data sector, a sector number region for writing sector information of the data sector, and a split and flag region for writing split information and flag information so as to hold a data processing operation for a predetermined time, when the data transferred from the external communication device is split by a servo sector. The data sector includes a data sync region for recording a synchronization signal for reading information written on the data sector, the ID region for recording ID information for the data sector, a PAD region for separating the ID region from sections of the data region, a data address mark region for indicating a validity of data written on the data sector, data transferred from the external communication device, and an error correction code region for writing an error correction code to automatically correct an error, in case where a defect is caused within the data.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
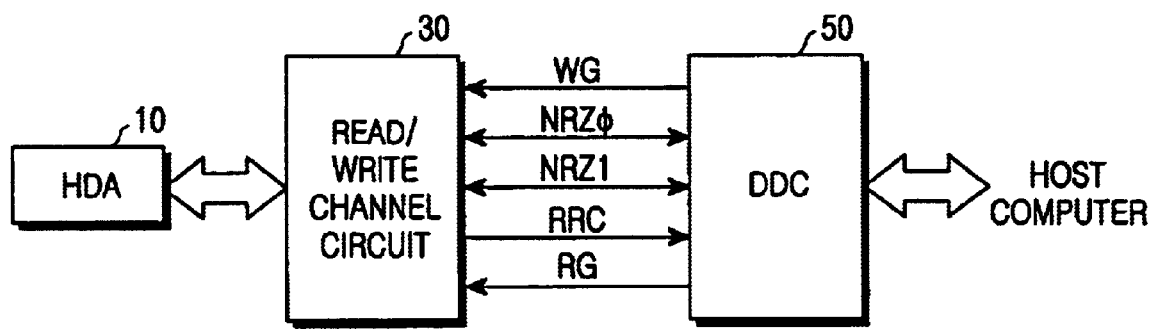
FIG. 1 is a block diagram of an exemplary hard disk drive (HDD)

Referring now to the drawings and particularly to FIG. 1, which illustrates an exemplary hard disk drive (HDD) which is commonly used as an auxiliary memory for a computer system for magnetically reading and writing data from/to a rotating magnetic disk. As shown in FIG. 1, the exemplary HDD includes a hard disk assembly (HDA) 10, a read/write channel circuit 30 and a disk data controller (DDC) 50. The read/write channel circuit 30 detects a data pulse from a signal received from a pre-amplifier (not shown) and decodes the detected data pulse to generate read data In addition, the read/write channel circuit 30 encodes write data received from the DDC 50 and provides the encoded write data to the pre-amplifier. The DDC 50 which interfaces between a host computer and the read/write channel circuit 30 receives and transfers the read and write data from/to the host computer under the control of a central processing unit (CPU) (not shown) which controls an overall operation of the HDD. As illustrated in FIG. 1, various control signals such as a write gate (WG) signal, a read gate (RG) signal, an NRZO signal, an NRZ1 signal, and a read reference clock (RRC) signal are directly communicated between the read/write channel circuit 30 and the DDC 50 in order to control the data read/write operations. In this case, a data sector commonly includes typical identification (ID) information.

Figure 2:
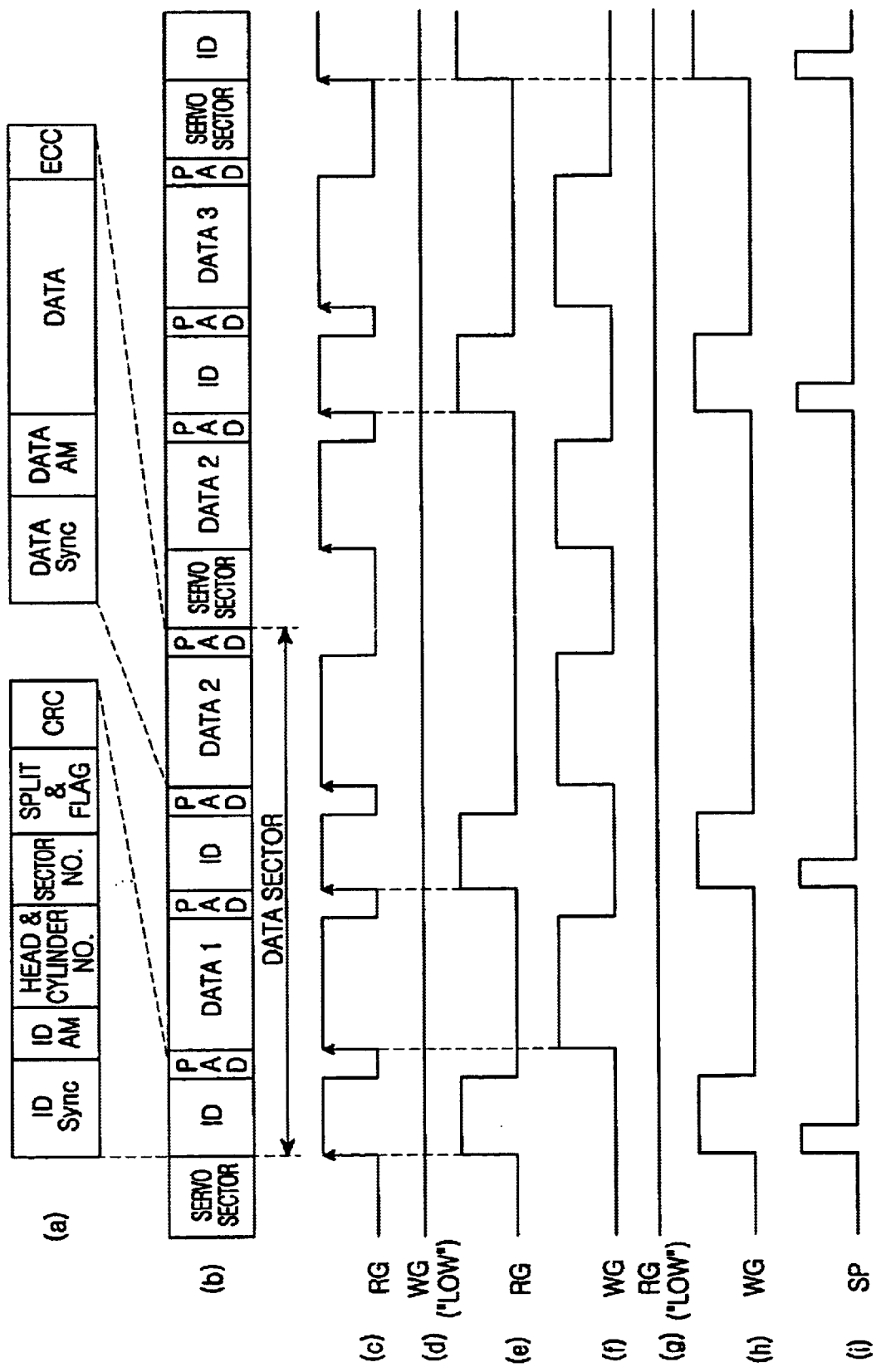
FIGS. 2A to 2I illustrate a data sector format in which a servo sector and a data sector are alternately written for the exemplary HDD, and timing diagrams of read and write gate signals according to the exemplary HDD.

Referring to FIGS. 2A to 2I, which illustrate a data sector format for the contemporary HDD in which a servo sector and the data sector including an ID region are alternately written, and timing diagrams according thereto. Specifically, FIG. 2B illustrates a data sector format of an arbitrary track on the magnetic disk, in which the servo sector and the data sector are alternately written. As illustrated, the data sector includes a plurality of ID regions and data regions. Further, a PAD region interposed between the ID region and the data region in the same data sector is a separation region for separating ID information from data information. The last PAD disposed within the data sector is a region for providing a margin between the adjacent data sectors. FIG. 2A illustrates detailed data formats of the ID region and the data region. Commonly, the ID region includes an ID sync, an ID address mark (AM), a head and cylinder number, a sector number, a split and flag, and a cyclic redundancy check code (CRC). The data region includes a data sync, a data address mark (AM), data, and an error correction code (ECC).

FIGS. 2C and 2D illustrate timing diagrams of the RG and WG signals generated from the DDC 500 during a data read mode of operation. FIGS. 2E and 2F illustrate timing diagrams of the RG and WG signals during a data write mode of operation. FIGS. 2G and 2H illustrate timing diagrams of the RG and WG signals during formatting operation; and FIG. 2I illustrates a timing diagram of a sector pulse SP for notifying a beginning of the data sector.

In the contemporary HDD, in order to read information of the ID region and the data region of the respective data sector, the RG signal is enabled, as shown in FIG. 2C, to synchronize the HDD with a clock frequency written on the magnetic disk by using the ID sync and the data sync. Namely, the ID information and the data information are read out in synchronism with the clock frequency previously written on the magnetic disk, using the ID sync and the data sync. In practice, as I have observed however, since the ID sync is commonly composed of many bytes (for example, 16 to 20 bytes), it is too restrictive for high density HDD application with increase storage capacity.

Figure 3:
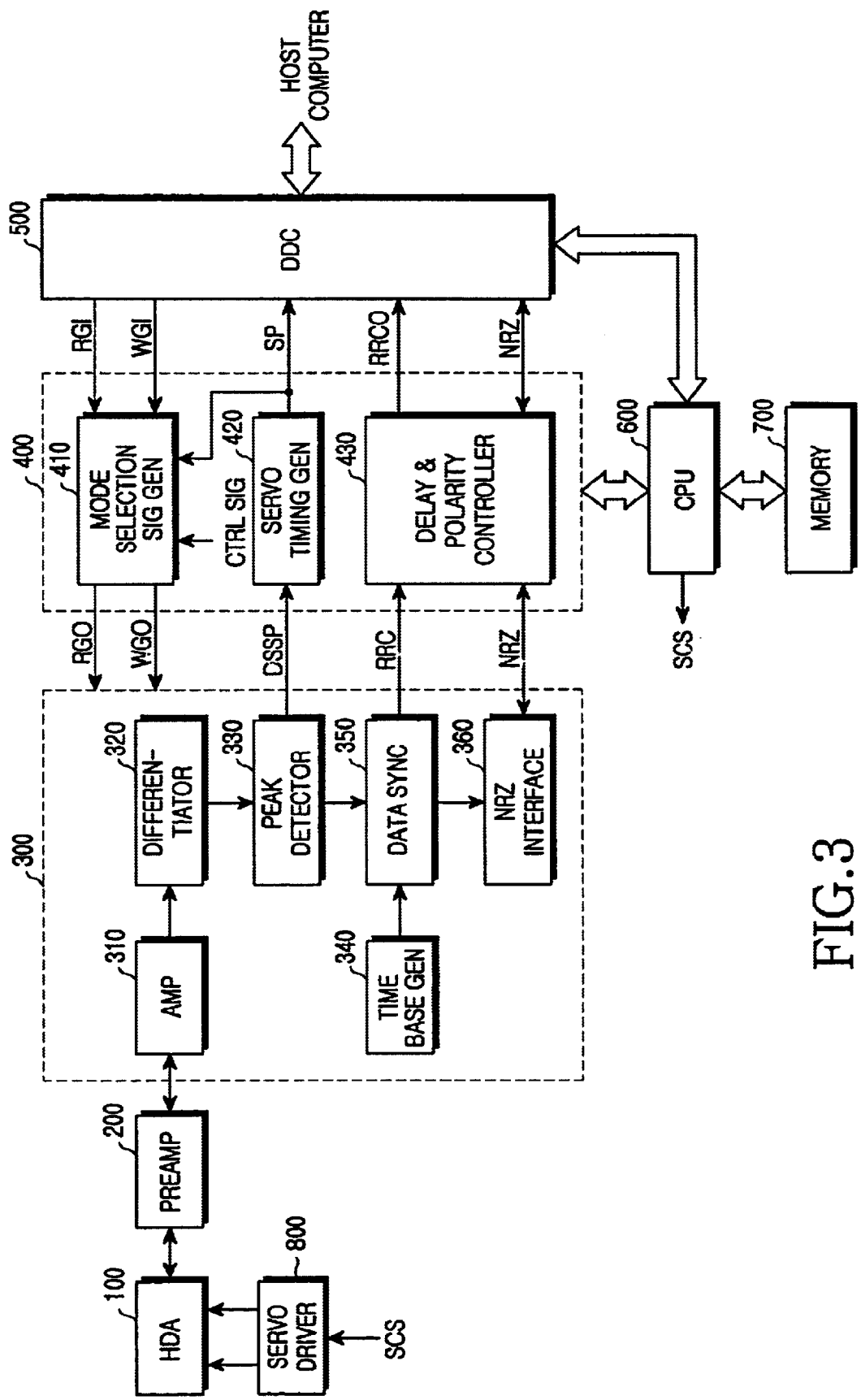
FIG. 3 is a block diagram of a high density HDD constructed according to the principles of the present invention.

Turning now to FIG. 3 which illustrates a high density hard disk drive HDD constructed according to the principles of the present invention. The hard disk drive HDD includes a hard disk assembly (HDA) 100, a pre-amplifier 200, a read/write channel circuit 300, a data sector timing generator 400, a disk data controller DDC 500, a central processing unit (CPU) 600, a memory 700, and a servo driver 800.

HDA 100 includes a magnetic disk (not shown) which is a recording medium, and a head (not shown) for magnetically reading and writing data received from a host computer from/on the magnetic disk. In addition, the HDA 100 includes an actuator (not shown) for moving the head horizontally centrifugally on the disk. A pre-amplifier 200 interposed between the HDA 100 and a read/write channel circuit 300 pre-amplifies a read signal picked up by the head during a data read mode of operation, and drives the head during a data write mode of operation to write writing data applied from the read/write channel circuit 300 on the magnetic disk.

The read/write channel circuit 300 connected between the pre-amplifier 200 and the data sector timing generator 400 includes an amplifier 310, a differentiator 320, a peak detector 330, a time base generator 340, a data synchronizer 350, aphase-locked loop (PLL) (not shown), and an NRZ interface 360. The amplifier 310 amplifies the read signal output from the pre-amplifier 200. The differentiator 320 and the peak detector 330 reshape the signal output from the amplifier 310. In particular, the peak detector 330 generates a digital servo sector pulse DSSP from the signal read at a servo region. Meanwhile, the signal read at a data region and reshaped by the peak detector 330 is applied to the data synchronizer 350 and is phase-locked by the PLL (not shown) with a clock generated from the time base generator 340. The NRZ interface 360 receives the signal output of the data synchronizer 350 to generate NRZ data.

Data sector timing generator 400 connected between the read/write channel circuit 300 and the DDC 500 includes a mode selection signal generator 410, a servo timing generator 420, and a delay and polarity controller 430, so as to generate timing signals related to the read signal from the data sector. Specifically, the mode selection signal generator 410 receives a read gate input signal RGI and a write gate input signal WGI from the DDC 500 in order to generate a read gate output signal RGO and a write gate output signal WGO for selecting the output modes. The RGO and WGO signals are applied to the read/write channel circuit 300. The servo timing generator 420 receives the digital servo sector pulse DSSP from the peak detector 330 to generate a sector pulse SP for notifying an ID region of each data sector. The sector pulse SP is applied to the DDC 500 and the mode selection signal generator 410. The delay and polarity controller 430 receives a read reference clock (RRC) and NRZ data from the data synchronizer 350 and the NRZ interface 360 respectively, and generates a read reference clock output (RRCO) and NRZ data to the DDC 500 with a predetermined time delay. The DDC 500 transfers the RGI, WGI and NRZ data to the data sector timing generator 400 during the read and write modes of operation under control of the CPU 600.

The CPU 600 is connected to the data sector timing generator 400 and the DDC 500 to control an overall operation of the hard disk drive HDD. A memory 700 connected to the CPU 600 stores a control program for the hard disk drive, and temporarily stores processing data generated during a control operation of the CPU 600. A servo driver 800 connected to the HDA 100 drives a spindle motor for rotating the magnetic disk and an actuator for horizontally moving the head on the magnetic disk, in response to a servo control signal SCS generated from the CPU 600.

Figure 4B:
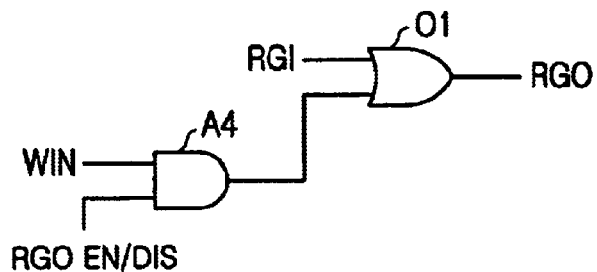
FIGS. 4A to 4C are detailed circuit diagrams of a mode selection signal generator as shown in FIG. 3.
Figure 4C:
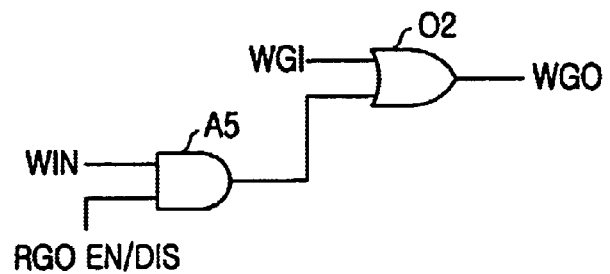
Figure 4A:
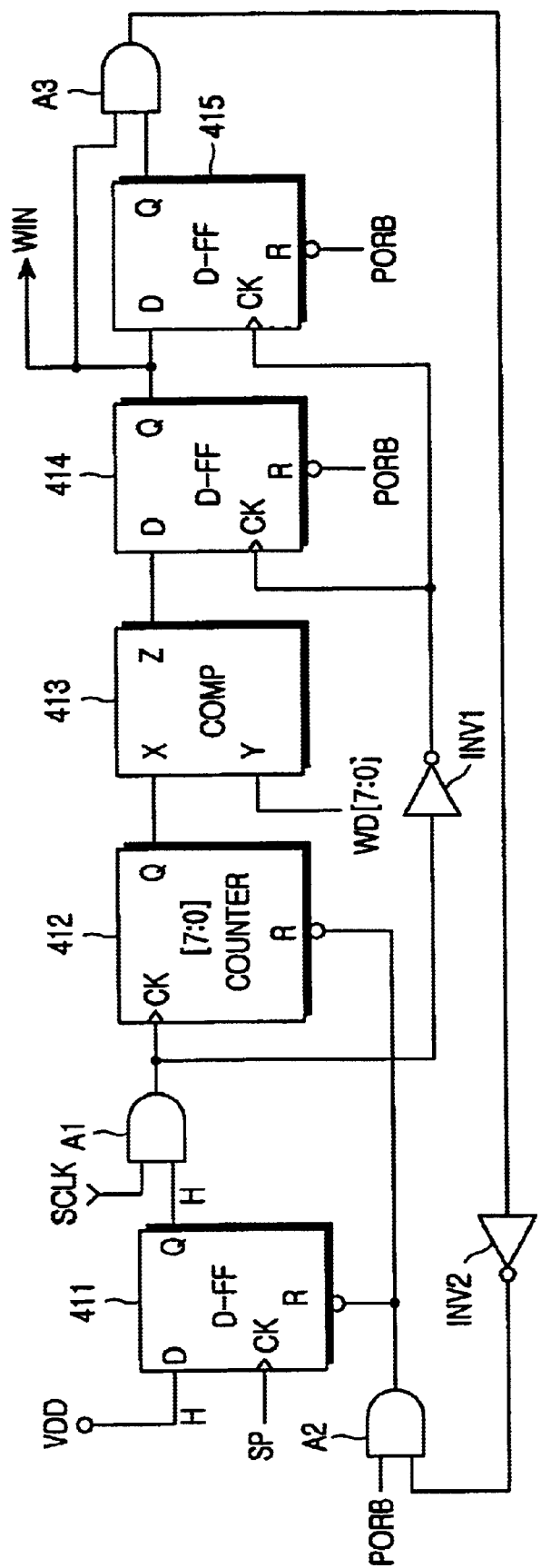

Referring to FIGS. 4A to 4C which are detailed circuit diagrams of the mode selection signal generator 410 as shown in FIG. 3. Specifically, FIG. 4A illustrates a window signal generator for generating a window signal WIN in response to the sector pulse SP supplied from the servo timing generator 420. FIG. 4B illustrates a RGO signal generator for generating a read gate output signal RGO by way of logically combining a read gate input signal RGI, the window signal WIN, and a first mode selection control signal RGO_EN/DIS generated from the CPU 600. FIG. 4C illustrates a WGO signal generator for generating a write gate output signal WGO by way of logically combining a write gate input signal WGI, the window signal WIN, and a second mode selection control signal WGO_EN/DIS generated from the CPU 600.

The window signal generator, as illustrated in FIG. 4A, includes three D flip-flops 411, 414 and 415, a counter 412, a comparator 413, three AND gates A1 to A3, and two inverters INV1 and INV2. The first D flip-flop 411 latches the supply voltage VDD at a rising edge of a sector pulse SP supplied from the servo timing generator 420. The first AND gate Al logically combines a system clock SCLK and the output signal of the D flip-flop 411. The counter 412 counts an output signal of the AND gate A1. The comparator 413 compares a counting value output of the counter 412 with 8-bit window data WD loaded from the CPU 600 in order to generate a logic high level when the counting value is the same as the 8-bit window data WD. The inverter INV1 inverts the output of the AND gate A1. The second D flip-flop 414 latches the output signal of the comparator 413 at a rising edge of the output signal of the inverter INVl in order to generate the window signal WIN. The third D flip-flop 415 latches the window signal WIN at a rising edge of the output signal of the inverter INV1. The AND gate A3 ANDs the output signals of the D flip-flops 414 and 415. The inverter INV2 inverts the output signal of the AND gate A3. The AND gate A2 logically combines the output signal of the inverter 12 INV2 and a power-on reset bar (PROB) signal in order to reset the D flip-flop 411 and the counter 4 prior to receiving the following sector pulse SP. The D flip-flops 414 and 415 are reset in response to the PROB signal.

The RGO signal generator, as illustrated in FIG. 4B, includes an AND gate A4 for logically combining the window signal WIN and a first mode selection control signal RGO_EN/DIS generated from the CPU 600, and an OR gate 01 for logically combining the read gate input signal RGI from the DDC 500 and the output signal of the AND gate A4 in order to generate a read gate output signal RGO.

The WGO signal generator, as illustrated in FIG. 4C, includes an AND gate A5 for logically combining the window signal WIN and a second mode selection control signal WGO_EN/DIS generated from the CPU 600, and an OR gate 02 for logically combining a write gate input signal WGI from the DDC 500 and the output signal of the AND gate A5 in order to generate a write gate output signal WGO.

Referring now to FIGS. 5A to 5K, operation of the mode selection signal generator 410 will be described in detail hereinbelow.

Figure 5:
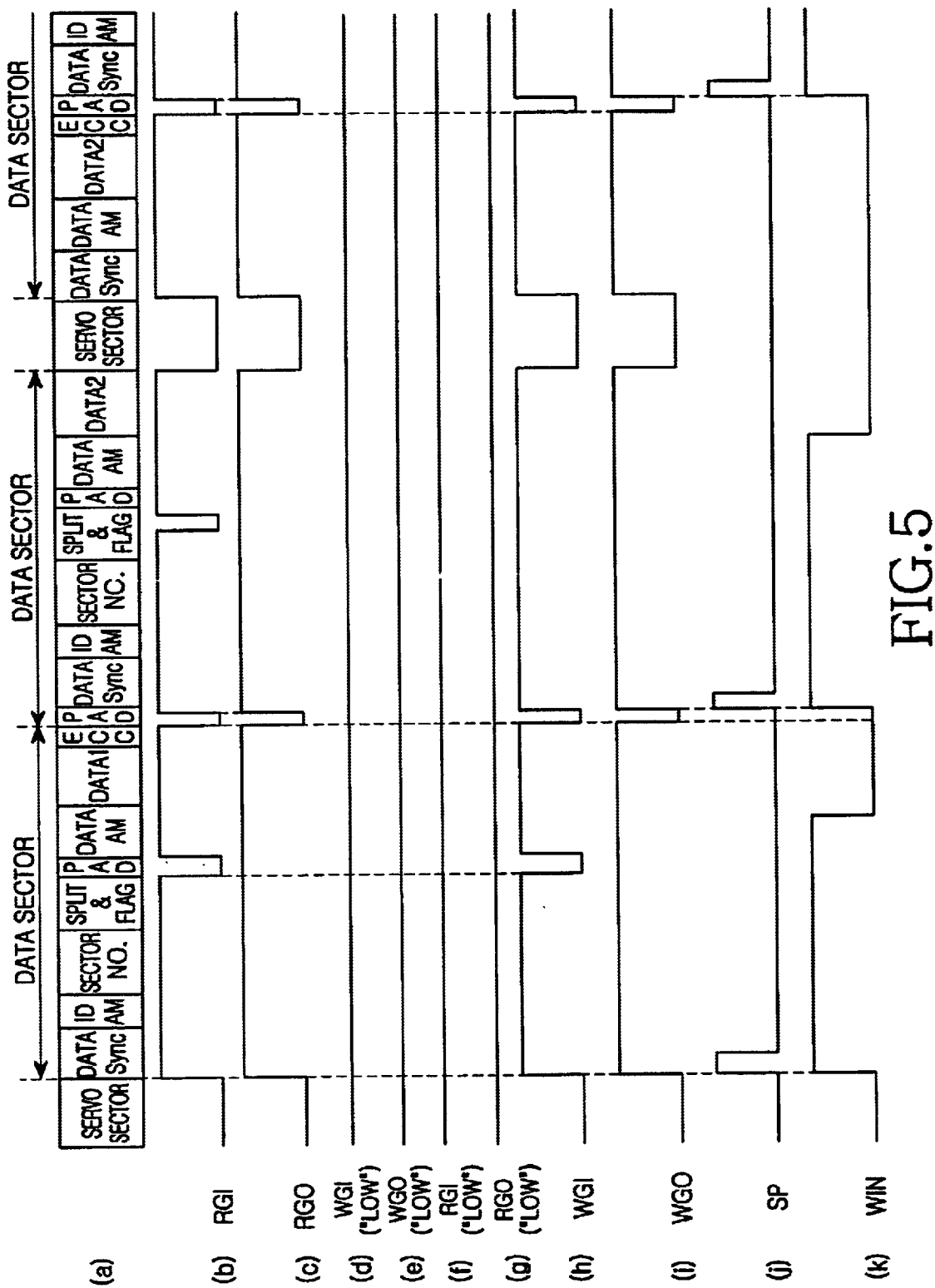
FIGS. 5A to 5K illustrate a data sector format and timing diagrams of read and write gate signals for high density HDD according to the principles of the present invention.

As illustrated in FIG. 5A, a data sector formulated according to the principles to the present invention and a servo sector are alternately placed on the magnetic disk. The data sector includes a data sync, an ID address mark (AM), a sector number, a split and flag, a PAD, a data AM, data, and an error correction code (ECC). With reference to a data sector shown in FIG. 5A, the data sector includes a data region and an ID region. The data region includes data sync, data AM, data, and ECC. The ID region is located between data sync and data AM. The ID region includes ID AM, sector number, and split and flag. Therefore, the ID region can be considered to be formed within the data region. The data sync is used for synchronizing a clock generated from the time base generator 340 with a clock written on the magnetic disk. A particular pattern is written on the ID AM and is used for checking a valid status of the succeeding sector number and the split and flag. The sector number is used for designating the number of the data sector based on an index The split is used for indicating a restart point at which the DDC 500 restart to enable the data region after holding the data processing for a predetermined time, when the data is split by the servo sector. The flag is used for excluding a defective sector during writing information, in the case where a defect is caused within the data sector. The data AM is used for checking the valid status prior to reading data. The data region which is commonly composed of 512 bytes, is used as an area on which actual data is written. The ECC which is composed of 11 bytes, is used as an area for correcting an error automatically, in the case where a defect with a particular length is caused within the data. The PAD is used for providing a margin between the current data sector and the following data sector.

FIGS. 5B to 5E illustrate timing diagrams of the read gate signals RGI and RGO, and the write gate signals WGI and WGO, applied and generated to/from the mode selection signal generator 410, during the read mode of operation. FIGS. 5F to 5I illustrate timing diagrams of the read gate signals RGI and RGO, and the write gate signals WGI and WGO, applied and generated to/from the mode selection signal generator 410, during the write mode of operation. FIG. 5J illustrates a timing diagram of the sector pulse SP generated from the servo timing generator 420. FIG. 5K illustrates a timing diagram of the window signal WIN generated from the window signal generator as shown in FIG. 4A.

Referring back to FIGS. 3, 4A–4C, and 5A–5K, detailed descriptions will be given hereinbelow as to how the read and write gate output signals RGO and WGO are generated from the mode selection signal generator 410 during the read/write modes of operation, in a high density hard disk drive using the inventive data sector format according to the present invention. First, upon receiving a data read or data write command from the host computer, the CPU 600 generates the servo control signal SCS to the servo driver 800 to perform a track search and trace control operation in order to read and write data from/to the magnetic disk. Then, the signal read by the head from a target track is transferred to the read/write channel circuit 300 via the pre-amplifier 200. The servo timing generator 420 receives the digital servo sector pulse DSSP generated from the peak detector 330 in order to generate the sector pulse SP for notifying one data sector to the DDC 500 and the mode selection signal generator 410. The timing diagram of the sector pulse SP is as illustrated in FIG. 5J. Then, the DDC 500 generates the read gate input signal RGI to the mode selection signal generator 410 in order to read the ID region and the data region in response to the sector pulse SP. An enablement time interval of the read gate input signal RGI applied to the mode selection signal generator 410 is as illustrated in FIG. 5B. As described above, the sector pulse SP generated from the servo timing generator 420 is applied, as a clock, to an input end of the D flip-flop 411 of the window signal generator shown in FIG. 4A.

Now, operation of the window signal generator will be described with reference to FIG. 4A hereinbelow. First, the D flip-flop 411 latches the supply voltage VDD at the rising edge of the sector pulse SP applied to the clock terminal CK thereof. The AND gate Al ANDs the latched VDD level output of the D flip-flop 411 and the system clock SCLK, and transfers the output thereof to a clock terminal CK of the counter 412. The counter 412 counts the system clock SCLK and, according to the counting results, generates the 8-bit counting data to an input terminal X of the comparator 413. The comparator 413 compares the 8-bit window data WD loaded from the CPU 600 with the 8-bit counting data output from the counter 412, and generates the logic high level at an output terminal Z thereof, when the window data WD is identical to the counting data. The D flip-flops 414 and 415 latch the window signal WIN at the rising edge of the output signal of inverter INV1 for inverting the output of the AND gate A1. Before the next sector pulse SP is received, the output signals generated from the D flip-flops 414 and 415 are ANDed and inverted by the AND gate A3 and the inverters INV2, respectively. The AND gate A2 ANDs the output signal of the inverter INV2 and the PROB signal to generate a reset signal to the D flip-flop 411 and the counter 412. As a result, the D flip-flop 411 and the counter 412 are reset before the next sector pulse SP is received.

The operations of the RGO signal generator of FIG. 4B and the WGO signal generator as shown in FIG. 4C will be described hereinbelow. First, operation of the RGO signal generator as shown in FIG. 4B will be described, in the case where the read command for reading the data written in a particular data sector is received from the host computer. Namely, upon receiving the read command from the host computer, the CPU 600 sets the first mode selection control signal RGO_EN/DIS to an enablement mode (i.e. RGO_EN) and sets the write gate output signal WGO to a disablement mode (i.e., WGO_DIS), respectively. Namely, the read gate enablement signal RGO_EN generated from the CPU 600 is applied to an input end of the AND gate A4 as shown in FIG. 4B. Meanwhile, the AND gate A4 logically combines the read gate enablement signal RGO-EN and the window signal WIN generated from the window signal generator of FIG. 4A and supplies an output thereof to the OR gate 01. The OR gate 01 then logically combines the output of the AND gate A4 and the read gate input signal RGI generated from the DDC 500 in order to generate the read gate output signal RGO. In this case, an enablement time interval of the read gate output signal RGO is as shown in FIG. 5C, and the write gate output signal WGO maintains a disabled state (i.e., the logic low state) during the read mode of operation. Namely, the enablement time interval of the read gate output signal RGO according to the present invention covers the full data sector region including the ID region and the data region.

Referring to FIG. 4C, operation of the WGO signal generator will be described, in the case where the read command is received from the host computer. First, upon receiving the read command from the host computer, the CPU 600 sets the second mode selection control signal WGO_EN/DIS to an enablement mode (i.e. WGO_EN) and sets the read gate output signal RGO to a disablement mode (i.e., RGO_DIS), respectively. Namely, the write gate enablement signal WGO_EN generated from the CPU 600 is applied to an input end of the AND gate A5 as shown in FIG. 4C. Meanwhile, the AND gate A5 logically combines the write gate enablement signal WGO_EN and the window signal WIN generated from the window signal generator as shown in FIG. 4A, and supplies an output thereof to the OR gate 02. The OR gate 02 then logically combines the output of the AND gate A5 and the write gate input signal WGI generated from the DDC 500 in order to generate the write gate output signal WGO. In this case, an enablement time interval of the write gate output signal WGO is as shown in FIG. 5I, and the read gate output signal RGO maintains a disabled state (i.e., the logic low state) during the write mode of operation. Namely, the enablement time interval of the write gate output signal WGO according to the present invention covers the full data sector region including the ID region and the data region. Therefore, the hard disk drive employing the data sector format as shown in FIG. 5A according to the present invention can check the validity of data by using the ID AM only, without the data AM.

A described foregoing, the hard disk drive according to the present invention forms a data sector in which the minimum information of the ID region is included into the data region, so as to exclude the ID sync, the head number, cylinder number, and CRC from the data sector. Therefore, tens of bytes which were conventionally occupied by the ID region in the data sector may be used for the data region, so that it can be possible to realize the high density hard disk drive.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for forming a data sector of a recording medium in a disk drive, the data sector including an identification region for containing identification information for the data sector and including a data region for containing data transferred from an external communication device, comprising the steps of:

recording a first subpart of the data region at a first position on the disk drive;

recording a second subpart of the data region at a separately located second position on the disk drive, said second subpart of the data region containing the data transferred from the external communication device; and recording the identification region at a third position on the disk drive interposed between the first and second subparts of the data region, the first subpart of the data region containing all of first synchronization information for reading the identification information contained in the identification region, and containing all of second synchronization information for reading data contained in the data region, the identification region sequentially comprising:

an identification address mark region for containing an identification address mark for the data sector;

a sector number region for containing sector information of the data sector; and a split and flag region for containing split information and flag information so as to hold a data processing operation for a predetermined time, when the data transferred from the external communication device is split by a servo sector.

2. The method of claim 1, further comprised of the data sector sequentially comprising:

the first subpart of the data region for containing the first and second synchronization information;

the identification region for containing the identification information for the data sector;

a pad region for separating said identification region and said second subpart of the data region;

a data address mark region for indicating a validity of data recorded on said data sector;

a data field for containing the data transferred from the external communication device; and an error correction code region for containing an error correction code to automatically correct an error upon occurrence of a defect when the data is recorded.

3. The method of claim 2, the second subpart of the data region comprising the data address mark region, the data field, and the error correction code region.

4. The method of claim 2, the first subpart of the data region comprising the first synchronization information and the second synchronization information.

5. An apparatus for forming a data sector of a hard disk drive including a magnetic disk without using an identification synchronization signal, a head for reading and writing data transferred from an external communication device from/to said magnetic disk, and a control unit for controlling data read/write operations, comprising:

a pre-amplifier for pre-amplifying a signal picked up by said head during a data read mode of operation, and driving said head to write encoded write data on said magnetic disk during a data write mode of operation;

a read/write channel circuit for encoding write data transferred from said external communication device to transfer encoded write data to said pre-amplifier, and decoding the signal read by said head into encoded read data;

a servo timing generator for generating a sector pulse from said encoded read data generated from said read/write channel circuit;

a disk data controller for generating a read gate input signal and a write gate input signal in response to said sector pulse generated from said servo timing generator; and a mode selection signal generator coupled to receive said read gate input signal and said write gate input signal from said disk data controller, for generating a read gate output signal and a write gate output signal which are enabled for a whole region of said data sector, in response to first and second mode selection control signals generated from said control unit, said data sector comprising:

a first subpart of a data region for containing all synchronization information for reading data information recorded on said data sector;

an identification region for containing identification information for said data sector; and a second subpart of said data region for containing said data transferred from said external communication device.

6. The apparatus of claim 5, said data sector sequentially comprising:

a data sync region corresponding to said first subpart of said data region;

said identification region;

a pad region for separating said identification region and said second subpart of said data region, said second subpart of said data region sequentially including a data address mark region, a data field, and an error correction code region;

said data address mark region for indicating a validity of data recorded on said data sector;

said data field for containing said data transferred from said external communication device; and said error correction code region for containing an error correction code to automatically correct an error upon occurrence of a defect.

7. The apparatus of claim 6, said identification region sequentially comprising:

an identification address mark region for containing an identification address mark for said data sector;

a sector number region for containing sector information of said data sector; and a split and flag region for containing split information and flag information so as to hold a data processing operation for a predetermined time, when said data transferred from said external communication device is split by a servo sector.

8. The apparatus of claim 5, said mode selection signal generator further comprising:

a window signal generator for counting a system clock in response to said sector pulse generated from said servo timing generator, and generating a window signal when a counting value reaches a predetermined window data value loaded from said control unit;

a read gate output signal generator for logically combining said window signal, said first mode selection control signal, and said read gate input signal, to generate said read gate output signal which is enabled for the whole region of said data sector; and a write gate output signal generator for logically combining said window signal, said second mode selection control signal, and said write gate input signal, to generate said write gate output signal which is enabled for the whole region of said data sector.

9. The apparatus of claim 8, said window signal generator comprising:

a first D flip-flop for latching a supply voltage at a rising edge of said sector pulse generated from said servo timing generator to produce a first flip-flop signal;

a first AND gate for logically combining said system clock and said first flip-flop signal to produce a first logic signal;

a counter for counting said first logic signal for a predetermined time to produce a counting value;

a comparator for comparing said counting value with said window data value and generating a comparison signal when said counting value reaches said window data value;

a first inverter for inverting said first logic signal to produce a first inverted logic signal;

a second D flip-flop for latching said comparison signal at a rising edge of said first inverted logic signal to produce a second flip-flop signal representing said window signal;

a third D flip-flop for latching said window signal at a rising edge of said first inverted logic signal;

a second AND gate for logically combining said first and second flip-flop signals to produce a second logic signal;

a second inverter for inverting said second logic signal to produce a second inverted logic signal; and a third AND gate for logically combining said second inverted logic signal and a power-on reset bar signal to produce a reset signal for resetting operation of said first D flip-flop and said counter.

10. The apparatus of claim 9, said first D flip-flop and said counter being reset in response to said reset signal prior to receipt of a next sector pulse generated from said servo timing generator.

11. The apparatus of claim 10, said second and third D flip-flops being reset in response to said power-on reset bar signal.

12. The apparatus of claim 11, said read gate output signal generator comprising:

an AND gate for logically combining said window signal and said first mode selection control signal; and an OR gate for logically combining an output of said AND gate and said read gate input signal to generate said read gate output signal which is enabled for the whole region of said data sector.

13. The apparatus of claim 12, said first mode selection control signal being generated for enabling generation of said read gate output signal of an enabled state for the whole region of said data sector during said data read mode of operation.

14. The apparatus of claim 13, said write gate output signal generator comprising:

an AND gate for logically combining said window signal and said second mode selection control signal; and an OR gate for logically combining an output of said AND gate and said write gate input signal to generate said write gate output signal which is enabled for the whole region of said data sector.

15. The apparatus of claim 14, said second mode selection control signal being generated for enabling generation of said write gate output signal of an enabled state for the whole region of said data sector during said data write mode of operation.

16. The apparatus of claim 15, said identification region sequentially comprising:

an identification address mark region for containing an identification address mark for said data sector;

a sector number region for containing sector information of said data sector; and a split and flag region for containing split information and flag information so as to hold a data processing operation for a predetermined time, when said data transferred from said external communication device is split by a servo sector.

17. The apparatus of claim 16, said data sector sequentially comprising:

a data sync region corresponding to said first subpart of said data region;

said identification region;

a pad region for separating said identification region and said second subpart of said data region, said second subpart of said data region sequentially including a data address mark region, a data field, and an error correction code region;

said data address mark region for indicating a validity of data recorded on said data sector;

said data field for containing said data transferred from said external communication device; and said error correction code region for containing an error correction code to automatically correct an error upon occurrence of a defect.

18. A disk drive, comprising:

a data recording disk having a plurality of concentric tracks, each track having servo sectors which servo information for use in positioning a transducer head is written and succeeding data sectors, each data sector sequentially consisting essentially of:

a first subpart of a data region including a sync region in which all synchronization information for reading data recorded on the data sector is written;

an identification region in which identification information for identifying the data sector for reading and writing operations is written;

a second subpart of said data region sequentially including a data address mark region, a data field, and an error correction code region;

said data address mark region in which data address mark information for indicating a validity of data recorded on said data sector is written;

said data field in which data transferred from an external communication device is written; and said error correction code region in which an error correction code for automatically correcting an error is written;

said transducer head for writing data to and reading data from the data sectors of the data recording disk, and for reading servo position information from the servo sectors of the data recording disk; and a positioning unit attached to said transducer head for positioning said transducer head across the tracks to perform said read and write operations, said identification region and said second subpart of said data region not including additional synchronization information.

19. The disk drive of claim 18, said identification region comprising:

an identification address mark region for containing an identification address mark for said data sector;

a sector number region for containing sector information of said data sector; and a split and flag region for containing split information and flag information so as to hold a data processing operation for a predetermined time, when the data transferred from the external communication device is split by a servo sector.

20. The disk drive of claim 18, the data sector not including a cyclic redundancy check.

21. The disk drive of claim 18, the data sector not including head identification data and not including cylinder identification data.

22. The disk drive of claim 18, said all synchronization information including synchronization information for reading the identification information recorded on the data sector.

23. A method for forming a data sector of a recording medium in a disk drive, the data sector including an identification region for containing identification information for the data sector and including a data region for containing data transferred from an external communication device comprising the steps of:

recording a first subpart of the data region at a first position on the disk drive;

recording a second subpart of the data region at a separately located second position on the disk drive, said second subpart of the data region containing the data transferred from the external communication device; and recording the identification region at a third position on the disk drive interposed between the first and second subparts of the data region, the first subpart of the data region containing all of first synchronization information for reading the identification information contained in the identification region, and containing all of second synchronization information for reading data contained in the data region, the data sector not including a cyclic redundancy check.

24. A method for forming a data sector of a recording medium in a disk drive, the data sector including an identification region for containing identification information for the data sector and including a data region for containing data transferred from an external communication device, comprising the steps of:

recording a first subpart of the data region at a first position on the disk drive;

recording a second subpart of the data region at a separately located second position on the disk drive, said second subpart of the data region containing the data transferred from the external communication device; and recording the identification region at a third position on the disk drive interposed between the first and second subparts of the data region, the first subpart of the data region containing all of first synchronization information for reading the identification information contained in the identification region, and containing all of second synchronization information for reading data contained in the data region, the data sector not including head data and not including cylinder data.

25. A method for forming a data sector of a recording medium in a disk drive, the data sector including an identification region for containing identification information for the data sector and including a data region for containing data transferred from an external communication device, comprising the steps of:

recording a first subpart of the data region at a first position on the disk drive;

recording a second subpart of the data region at a separately located second position on the disk drive, said second subpart of the data region containing the data transferred from the external communication device; and recording the identification region at a third position on the disk drive interposed between the first and second subparts of the data region, the first subpart of the data region containing all of first synchronization information for reading the identification information contained in the identification region, and containing all of second synchronization information for reading data contained in the data region, the data sector including exactly one synchronization region, the one synchronization region corresponding to the first subpart of the data region.

* * * * *